L. W. POND.
Saw-Filing Benches.

No. 156,856. Patented Nov. 17, 1874.

WITNESSES:

INVENTOR:
Levi W. Pond

UNITED STATES PATENT OFFICE.

LEVI W. POND, OF EAU CLAIRE, WISCONSIN, ASSIGNOR OF ONE-HALF HIS RIGHT TO EAU CLAIRE LUMBER COMPANY.

IMPROVEMENT IN SAW-FILING BENCHES.

Specification forming part of Letters Patent No. 156,856, dated November 17, 1874; application filed June 15, 1874.

*To all whom it may concern:*

Be it known that I, LEVI W. POND, of Eau Claire, in the county of Eau Claire and State of Wisconsin, have invented new and useful Improvements in Saw-Benches, of which the following is a full description, reference being had to the accompanying drawings, in which—

Figure 1:
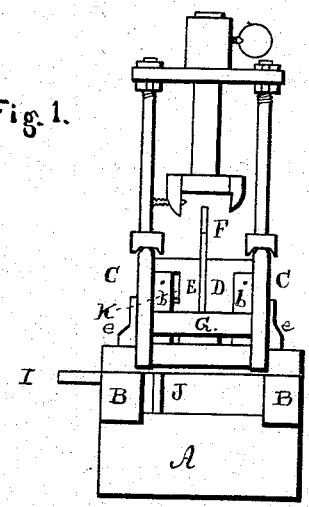
Figure 2:
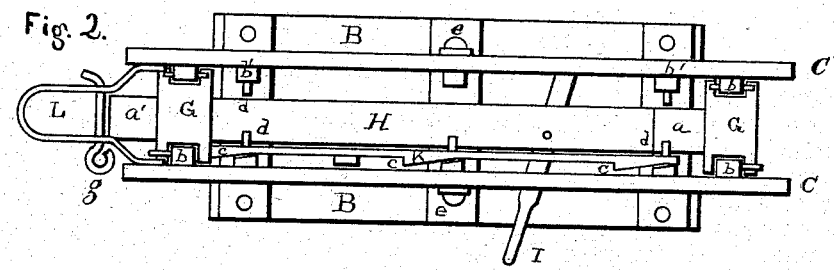
Figure 3:
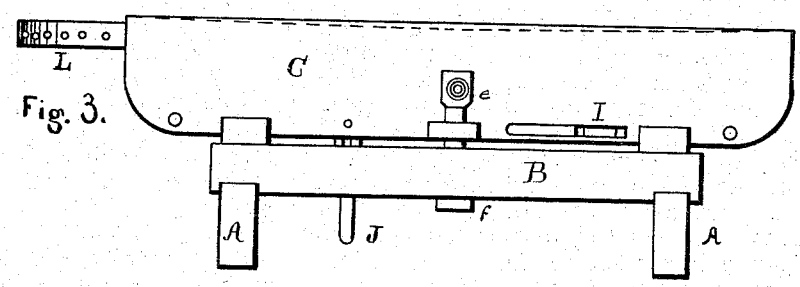
Figure 4:
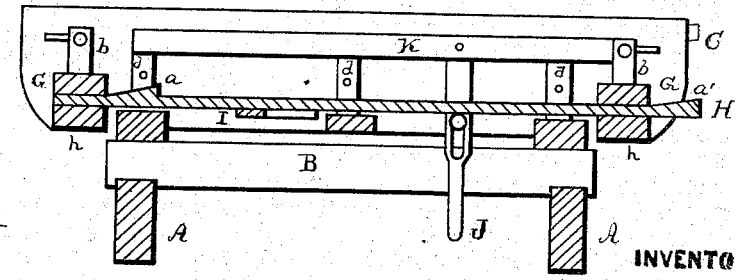

Figure 1 is an end view, with a saw-jointer placed on; Fig. 2, a top or plan view; Fig. 3, a side view, and Fig. 4 a longitudinal vertical section.

The object of this invention is to provide ways upon which a saw-jointer, swage, or other device is run, so that they can be curved or adjusted to the line of the saw, and to hold the saws in proper position while being jointed or otherwise operated upon; and its nature consists in the several combinations hereinafter described and claimed.

In the drawings, A B represent any suitable bed-frame; C, the runways; D E, the saw-clamps; F, the saw; G, the adjustable bars upon which the saw rests; H, the sliding bar for adjusting the bars or blocks G; I, the lever for operating the bar H; J, the lever for operating the bar K; K, the sliding bar located at the side of one of the clamps for tightening the saw when adjusted; L, the gage for adjusting the length of the saws; $a$, the inclines on the sliding bar H for lifting the blocks G; $b$, the guides for keeping the blocks G in position; $b'$, the guides for keeping the clamp-bars in position; $c$, the inclines on the bar K for operating the clamp; $d$, the pins or supports upon which the clamp-bars rest; $e$, bolt, and $f$ nut, for adjusting the runways C; $g$, the gage and pin; and $h$, cross-bars.

The frame A B is made of wood or metal, as may be desired. On this frame are placed the runways C, which are made sufficiently strong to hold the clamping device, and yet not so strong but that they will yield slightly under the action of the bolt $e$ and nut $f$, which will depress them at the center, as shown by the dotted line in Fig. 3. I find this necessary, for the reason that a saw which is straight when strained, uniformly becomes concave when the pressure is taken off; and in order to properly joint the saw, the runways must take the same form that the saw has when unstrained. If there were no provision for this different saws would be improperly jointed, and would not be uniform either in line or in rake when placed in a gang, sash, or gate. In order to further preserve this uniformity of line and rake, I make the gage L at one end and adjust the pin $g$ for the length of saws in any particular gang, and place the lower end of each saw against the pin, which will give the saws a uniform position when jointing them.\ The clamp-bars D E are supported upon pins $d$, and kept in place by the guides $b'$, which prevent lateral movement. The clamp-bar E is recessed sufficiently at the side to receive the sliding bar K, as shown at Fig. 1. The sliding bar K is provided with a suitable number of inclines, $c$, to force this bar E against the saw and hold it firmly against the saw, and secure the saw in position. The back of the saw, when placed in the machine, rests upon the blocks G, and is adjusted to the proper line by means of false blocks or packing placed on the blocks G, or by running set-screws through each of the cross-bars $h$, which will elevate or lift the sliding bar H, and when properly adjusted the saw is uniformly raised by operating the lever I, so as to bring the inclines or cams $a\ a'$ under the blocks G. This obviates the necessity of altering or changing the jointer.

When one saw of a gang is adjusted to the proper line, any variation from this line in the other saws of the same gang will be adjusted by filing or dressing off the back of the saw, so as to keep the lines uniform. Differences in width will be adjusted by the jointer.

When the saw is in proper position, it is clamped by means of the lever J, by which the bar K is moved, and the cams or inclines $c$ brought to bear, so as to press the bar E against the saw. By bending the lever I, or slightly changing its position, it can be brought out under the way C, instead of through it, as shown.

This machine, while it is designed chiefly for use in connection with a saw-jointer, will also be found useful in connection with saw-swages, or in holding saws for filing, setting, &c.

In order to get the full benefit of this jointer-frame, it is essential to have the saws properly lined and gaged with the runways. In order to do this, the following instructions must be observed: When hooks and straps are riveted to the saw, hang the saws in the gate, and strain in the usual manner; then place a straight-edge on the right-hand side of each saw, (standing in front and facing the same,) just back of the roots of the teeth, and at such an angle from a plumb-line as it is desired to have the saw rake after being jointed; then scratch a line on the saw its full length. This is a line or starting-point to adjust the machine by, and also for dressing and fitting the back of the saws where they rest on the adjusting-blocks. In order to bring the lines on the saws parallel with the ways, adjust the pin in the end strap to gage the saws as to length; put a few saws on the adjusting-blocks against the pin, one after another, and see how much the lines are out of parallel with the ways of the machine; then regulate the adjusting-blocks by raising one end, in the manner before described, so as to bring about one-half of the lines on the saws parallel, or nearly so, with the ways of the machine. The saws that have not their lines parallel with the ways must be dressed off on their backs where they rest on the blocks, so as to bring both ends of each line parallel with the top of the ways. The lines on the saws, when unstrained, are curved, and it is necessary to spring the ways uniform with that curve by bolts and nuts.

If the saws have the detachable and adjustable hooks and straps, or where the saws bear against the back gages, and their rake can be adjusted by those gages, the operation of straining and lining in the gate can be dispensed with, except on one saw to adjust the ways by, in order to get the curved line. They may, however, be correctly fitted in the following manner: Adjust the blocks G exactly parallel with the saws; see where the saws bear against the back gages; then, where their backs rest on the blocks, file off sufficient to bring those bearings exactly parallel with the bearings against the gages; spring the ways to suit the curved line on one saw, and joint, as before.

What I claim as new is as follows:

1. The yielding ways C, in combination with the screw-bolt $e$ and side rails B of the frame, substantially as specified.

2. The combination of the sliding bar H, provided with inclines $a$, and the lever T, with the movable blocks E, for lifting the saws, substantially as described.

3. The sliding bar K, provided with the inclines $c$, and the lever J, with the clamping-bar E, for clamping the saw, substantially as described.

4. The gage L, in combination with the ways C, for giving and preserving a uniform bearing of the saws on the blocks G, substantially as specified.

LEVI W. POND.

Witnesses:
E. A. WEST,
O. W. BOND.